US006149696A

United States Patent [19]

Jia

[11] Patent Number: 6,149,696

[45] Date of Patent: Nov. 21, 2000

[54] COLLOIDAL SILICA SLURRY FOR NIP PLATED DISK POLISHING

[75] Inventor: Kang Jia, Fremont, Calif.

[73] Assignee: Komag, Inc., San Jose, Calif.

[21] Appl. No.: 08/965,099

[22] Filed: Nov. 6, 1997

[51] Int. Cl.$^7$ .................................................... B24B 29/02

[52] U.S. Cl. ................................ 51/308; 51/309; 216/89

[58] Field of Search .................................... 438/693, 692; 106/3; 31/309; 51/308; 216/89; 252/79.2

[56] References Cited

U.S. PATENT DOCUMENTS

| | | | |
|---|---|---|---|
| 3,385,682 | 5/1968 | Lowen | 106/3 |
| 4,705,566 | 11/1987 | Senda et al. | 106/3 |
| 4,769,046 | 9/1988 | Senda et al. | 106/3 |
| 4,954,142 | 9/1990 | Carr et al. | 51/309 |
| 4,959,113 | 9/1990 | Roberts | 438/692 |
| 5,167,096 | 12/1992 | Eltoukhy et al. | 51/281 |
| 5,225,034 | 7/1993 | Yu et al. | 438/693 |
| 5,230,833 | 7/1993 | Romberger et al. | 252/363.5 |
| 5,246,624 | 9/1993 | Miller et al. | 51/308 |
| 5,340,370 | 8/1994 | Cadien et al. | 51/308 |
| 5,352,277 | 10/1994 | Sasaki | 51/309 |
| 5,366,542 | 11/1994 | Yamada et al. | 106/3 |
| 5,571,373 | 11/1996 | Krishna et al. | 156/636.1 |
| 5,575,837 | 11/1996 | Kodama et al. | 106/3 |
| 5,643,837 | 7/1997 | Hayashi | 437/228 |
| 5,658,659 | 8/1997 | Chen et al. | 428/332 |
| 5,700,383 | 12/1997 | Feller et al. | 216/88 |
| 5,709,588 | 1/1998 | Muroyama | 451/41 |
| 5,738,800 | 4/1998 | Hosali et al. | 216/99 |
| 5,759,917 | 6/1998 | Grover et al. | 106/11 |
| 5,783,489 | 7/1998 | Kaufman et al. | 438/692 |
| 5,804,513 | 9/1998 | Sakatani et al. | 51/309 |
| 5,858,813 | 1/1999 | Scherber et al. | 438/693 |
| 5,916,819 | 6/1999 | Skrovan et al. | 438/692 |
| 5,935,278 | 8/1999 | Ishitobi et al. | 106/3 |

FOREIGN PATENT DOCUMENTS

| | | |
|---|---|---|
| 0846741 A1 | 6/1998 | European Pat. Off. . |

OTHER PUBLICATIONS

Carpio et al, "Initial Study on Copper CMP slurry Chemistries", Thin Solid Films, 266, pp. 238–244, 1995.

Carpio, R. et al "Initial Study on Copper CMP Slurry Chemistries" *Thin Solid Film* 1995, pp. 238–244 no month.

Sabde, G.M. Slurry Development For Chemical Mechanical Polishing of Tungsten, CMP–MIC Conference, no month 1997, pp. 331–334.

Pohl, M., et al., "The Importance of Particle Size to the Performance of Abrasive Particles in the CMP Process", Journal of Electronic Materials, vol. 25, Nov. 10, 1996, pp. 1612–1616.

Material Safety Data Sheet, 1996 no month.

Vander Voort, G.F., "Polishing With Colloidal Silica", 1997, pp. 1–13 no month.

Ali, I., et al., "Chemical–13 Mechanical Polishing of Interlayer Dielectric: A review", *Solid State Technology* Oct. 1994, pp. 63–70. no month or year.

Niernynck, J.M., et al., The Addition of Surfactant to Slurry for Polymer CMP: Effects on Polymer Surface, Removal Rate and Underlying Cu, *Thin Solid Films*, 1996 pp. 447–452. no month or year.

Talke, F., "On Tribological Problems in Magnetic Disk Recording Technology", UCSD, Center for Magnetic Recording Research, pp. 18–25. no month or year.

Hu, Z. Y. et al. "Chemical–Mechanical Polishing of PECVD Silicon Nitride" *Thin Solid Films*, 1996, pp.453–457. no month or year.

Ali, Iqbal, et al., "Charged Particles in Process Liquids", Semiconductor International, Apr. 1990, pp. 92–95.

*Primary Examiner*—C. Melissa Koslow

[57] ABSTRACT

A novel colloidal silica slurry including additives for enhancing the removal rate of a metallic workpiece, preventing etch pits, and enhancing smoothness. These additives include $HNO_3$, $H_2O_2$ and $Al(NO_3)_3$. In lieu of colloidal silica, colloidal alumina can be used. The metallic workpiece can be NiP, Ni, Al or other appropriate materials.

18 Claims, 6 Drawing Sheets

COLLOIDAL SILICA SLURRY FOR NIP PLATED DISK POLISHING

BACKGROUND OF THE INVENTION

This invention relates to the formulation of colloidal slurry used to polish NiP plated substrates. This formulation significantly increases the material removal rate during polishing, reduces polish defects, and improves the polished surface finish.

A metallic magnetic thin film disk used in a computer disk drive typically comprises an aluminum substrate plated with NiP, an underlayer sputtered onto the plated NiP, a magnetic Co alloy sputtered onto the underlayer, a carbon protective overcoat sputtered onto the magnetic layer and a lubricant layer deposited on the carbon.

Before depositing the underlayer, the plated NiP is polished to remove surface defects and to lower surface roughness which strongly affects the flying height of a recording head over the disk. A increasing recording density in computer disk drives. At present, the lowest surface roughness Ra obtained using commercially available slurries for NiP plated substrate polishing is about 0.5 nm. ("Ra" is a well-known measure of surface roughness.) However, polishing defects become severe problems as smaller abrasive particles are used in the slurry to reduce the polished surface roughness. Two kinds of polish defects, micro-scratches and polish pits, are apt to form on the NiP polished surface. In general, micro-scratches are thought to be caused by large agglomerated particles. Polish pits are formed either by chemical attacking or other unknown causes.

Current commercially available slurries used for polishing NiP plated substrates typically comprise two components: alumina abrasive particles and an acidic etchant. The abrasive particle size ranges from 0.1 $\mu$m to about 1 $\mu$m. The slurry pH ranges from 2 to 6 for various polish process applications. Polishing with these slurries is based on micro-machining, wherein the abrasive has an angular shape and grinds the polished surface. The acidic etchant helps increase the efficiency of the micro-machining and improves the polished surface finish by chemical etching. Although a smoother polished surface can be obtained by using smaller abrasive particles, it is still not possible to make scratch-free polished surfaces. Further, these conventional slurries are apt to cause polish pits. This becomes worse with decreasing abrasive particle size to lower surface roughness. Also, smaller abrasive particles create more numerous polishing pits.

In order to eliminate the above-mentioned problems of conventional slurries, colloidal silica has been considered for polishing NiP plated substrates. Colloidal silica has long been successfully used for polishing various materials, such as silicon, gallium arsenide, indium phosphide and titanium, to form a super-smooth and scratch-free surface finish. Colloidal silica slurries used for chemical-mechanical polishing (CMP) typically include aqueous colloidal silica with an etchant (oxidizer) as a polishing promoter. Various kinds of chemicals are used in colloidal silica slurries for different polishing applications to achieve either a high material removal rate or better polished surface finishes with fewer polish defects. Alkaline chemicals, for instance, are used as etchants in colloidal silica slurries to reduce surface roughness in semiconductor wafer rough polish processes as described in U.S. Pat. No. 5,571,373 issued Nov. 5, 1996 to Krishna et al., incorporated herein by reference. Persulphate, as described in U.S. Pat. No. 5,575,837 issued Nov. 19, 1996 to Kodama et al., is used as an etchant in a colloidal silica slurry for mirror-finishing metal surfaces.

Unfortunately, several problems are encountered when attempting to use these commercially available colloidal silica slurries to polish NiP plated substrates. For example, existing commercial colloidal silica slurries, either with an alkaline etchant or an acidic etchant, exhibit a very low NiP removal rate. Further, these slurries also cause polish pits, which are caused by chemical attacking, and micro-scratches. There is presently no adequate colloidal silica formulation for polishing NiP.

To make a colloidal silica slurry applicable to NiP plated substrate polishing, a new formulation is desired to increase slurry's NiP removal rate and to decrease polish defects. It is known in the art that adding an oxidizer or changing chemistry can increase the material removal rate or remove polish defects. However, the extent to which one can add an oxidizer or change the slurry chemistry is bounded by colloidal chemistry as described by I. Ali et al. in "Charged Particle in Process Liquids", published in Semiconductor Intl., in 1990. The colloidal suspension may be broken or the aqueous colloidal abrasive can jell due to the pH value change caused by oxidizer addition or other chemistry change. On-line hydrogen peroxide addition was used by the inventor to improve the polish performance of colloidal silica slurry. (By "on-line hydrogen peroxide addition," I mean that hydrogen peroxide was added to the slurry shortly before use.) A better polished surface finish was obtained by adding hydrogen peroxide to the slurry. However, the NiP removal rate was not significantly increased by adding hydrogen peroxide. Further, hydrogen peroxide cannot remove polish scratches.

Because of the above-mentioned low NiP removal rate and polish defect problems, it would be desirable to make a new formulation which would increase the NiP removal rate of the colloidal slurry and reduce the number of polish defects, and simultaneously provide a good polished surface finish.

SUMMARY

In one embodiment of my invention, aluminum nitrate, nitric acid and hydrogen peroxide are added to a colloidal silica polishing slurry to significantly increase the material removal rate, reduce the number of polish defects, and decrease polished surface roughness. The slurry is used to polish Ni, Al, NiP, other Ni alloys or Al alloys, or other metals. I have found that aluminum nitrate used with nitric acid significantly increases the NiP removal rate of colloidal slurry. Further, nitric acid helps to stabilize the colloidal suspension, and hydrogen peroxide helps to remove polish pits.

In another embodiment of my invention, aluminum nitrate, nitric acid and hydrogen peroxide are added to a colloidal alumina slurry (or other colloidal aqueous abrasive slurries) to achieve an improved material removal rate and an improved smooth polished surface.

In another embodiment of my invention, the above formulation is used with slurries comprising non-colloidal abrasive particles, e.g. non-colloidal silica or alumina.

In another embodiment of my invention, the above-mentioned formulation is used with colloidal abrasives other than silica or alumina.

A method in accordance with one embodiment of the invention includes the step of polishing a workpiece with a slurry. The slurry comprises abrasive particles and a metal nitrate salt. The slurry has a pH less than about 3.5, and the metal nitrate salt increases the polishing rate of the slurry. The slurry also comprises $H_2O_2$ and $HNO_3$. The abrasive particles comprise colloidal abrasive particles.

In one embodiment, the metal nitrate salt comprises $Al(NO_3)_3$.

DETAILED DESCRIPTION

Figure 1A:
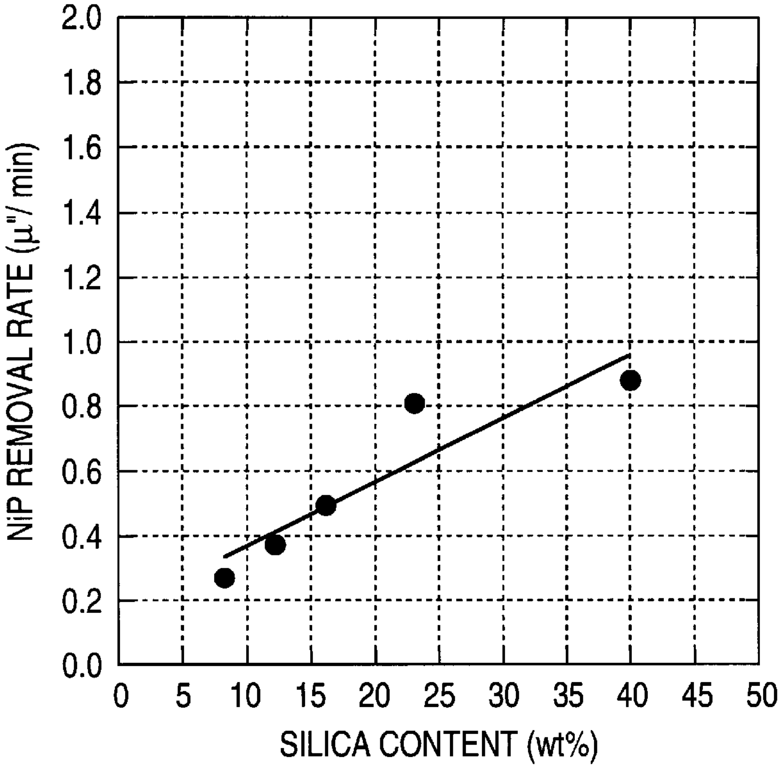
FIGS. 1A and 1B illustrate the results of a polish test performed using a planetary polisher and a colloidal silica slurry with an alkaline etchant having various silica contents. The NiP polish performance was measured in terms of NiP removal rate (FIG. 1A) and polished surface roughness (FIG. 1B).

A colloidal silica slurry in accordance with one embodiment of my invention is made by mixing aqueous colloidal silica with aluminum nitrate, nitric acid and hydrogen peroxide. The slurrv is typically used to polish and etch a metal surface such as NiP, Ni or Al. The silica content is between about 2 and 40 wt. % and typically 11 wt. %. The particle size can be from about 50 to 80 nm although other particle sizes can be used. The pH of the slurry, as measured at 25° C., is between about 1.5 and 3.5. The pH is preferably greater than 2 for safety reasons, and typically about 2.7.

The pH is typically controlled by adding aluminum nitrate (Al $(NO_3)_3$). As explained below, I have discovered that adding aluminum nitrate to the slurry increases the polishing rate. In lieu of aluminum nitrate, other acidic metal nitrate salts capable of reducing the pH to 3.5 or less can be used. In one embodiment, ferronitrate is used in lieu of aluminum nitrate.

One example of a slurry in accordance with my invention comprises between 2 and 40 wt. % silica, 0.1 and 2.5 wt. % $Al(NO_3)_3$, greater than 0 wt. % but less than or equal to 1 wt. % $HNO_3$, and between 0.1 and 3 wt. % $H_2O_2$. In one embodiment, the slurry comprises greater than 0 wt. % but less than 0.2 wt. % $HNO_3$, and between 0.1 and 2 wt % $Al(NO_3)_3$. In another embodiment, the slurry contains between 0.02 and 0.1 wt. % $HNO_3$ and between 0.2 and 1 wt. % $Al(NO_3)_3$.

I have found that a silica slurry including a high silica content and aluminum nitrate sometimes jells. I have also found that there are at least two ways to avoid this phenomenon: 1) add water to the slurry to dilute it, or 2) add nitric acid ($HNO_3$) to the slurry.

As explained below, depending upon polishing conditions, pits may be formed in the workpiece being polished. I have discovered that hydrogen peroxide ($H_2O_2$) can be added to the slurry to prevent pit formation.

To prepare the slurry formulation in accordance with one embodiment of my invention, I started with a commercially available silica slurry available from Fujimi America, located in Wilsonville, Oregon. The slurry is sold under the tradename Compol 80. The pH of Compol 80 is about 10. I added to this slurry a solution comprising a solution comprising 30 wt. % $Al(NO_3)_3$, a solution comprising 70 wt. % $HNO_3$, and a solution comprising 30 wt. % $H_2O_2$.

The ratio was 25 parts of the $Al(NO_3)_3$ solution; 1 part of the $HNO_3$ solution; and 25 parts of the $H_2O_2$ solution. A sufficient amount of this mixture was added to reduce the slurry pH to 2.7. (In other embodiments, instead of using 1 part of the $HNO_3$ solution and 25 parts of the $H_2O_2$ solution, other concentrations can be used, e.g. between 0 and 2 parts $HNO_3$ and between 2 and 50 parts $H_2O_2$.)

A slurry in accordance with my invention is useful for polishing a NiP layer plated onto an Al substrate. (NiP is typically electroless-plated onto Al substrates, e.g. to a thickness between 8 to 10 $\mu$m, as part of a magnetic disk manufacturing process.) I have discovered that a slurry in accordance with my invention provides the benefits of:

1) an increased NiP removal rate;

2) improved NiP smoothness; and 3) avoidance of pit formation during polishing.

(In lieu of an Al substrate, other substrate materials may be used in accordance with my invention, e.g. glass, glass ceramic, sputtered carbon, ceramics or other materials having a NiP or other metallic material formed thereon, either by plating, sputtering or other process.)

A set of experiments were performed on NiP-coated Al substrates to evaluate the performance of slurries used to polish the NiP. The polish performance experiments included a) testing NiP removal rate using a planetary polisher; b) evaluating polished NiP surface roughness on a texture measurement system; c) evaluating polish scratches under a high intensity light; and d) testing the polish pitting propensity using a single-disk polisher. The polish performance of the colloidal silica slurry in accordance with one embodiment of my invention was compared with a commercial colloidal silica slurry which comprised the same colloidal silica abrasive (and the same silica content) and an alkaline etchant. The commercial slurry was the abovementioned Compol 80.

The NiP removal rate test was performed by measuring the NiP thickness of NiP plated substrates before and after a polish test, and dividing the difference in these two measurements by polish time. Two polish runs (forty-two disks per run) were performed with the planetary polisher using each tested slurry, and seven disks were measured from each test run. The polishing machine was model no. 9B-14, available from SpeedFam International Corp. of Chandler, Ariz. The average of the NiP removal rate calculated from the measurements of the two runs (fourteen measurements) of each slurry were taken as the final result. The slurry flow rate was 500 ml/minute, the ring gear RPM (revolutions per minute) was 8.9, the sun gear RPM was 3.6, the bottom plate RPM was 16.5 and the top plate RPM was 5.5. The normal load was 230 kg.

Figure 1B:
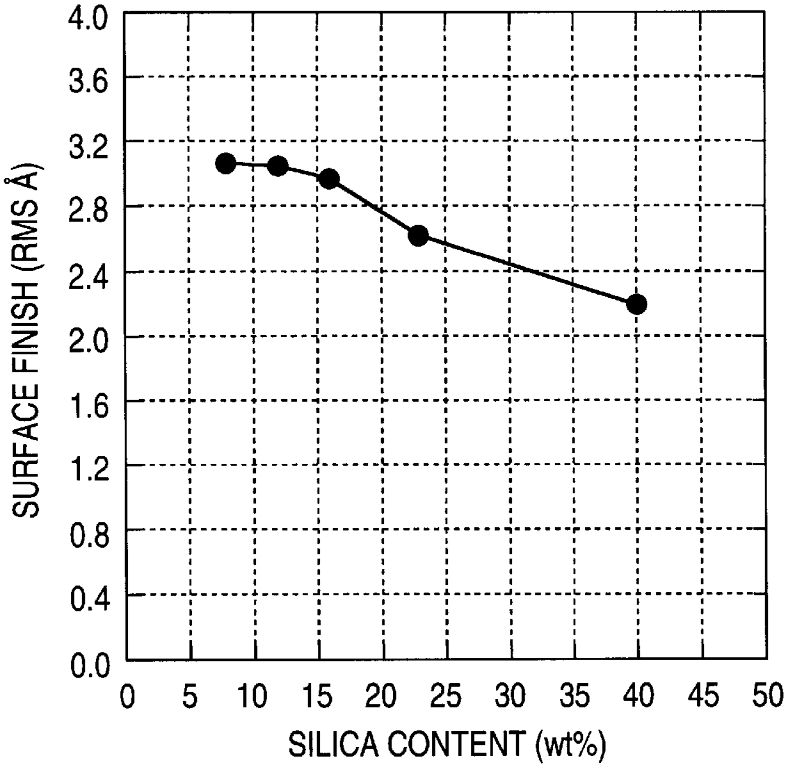

FIGS. 1A and 1B show the NiP polish performance of Compol 80 colloidal silica slurry with the alkaline etchant and various silica contents. The silica content was varied by diluting the slurry with water. The NiP removal rate decreased with increasing water dilution. Also, polish pits were observed with increased water dilution. The polished surface roughness was increased by the presence of the pits.

Figure 2A:
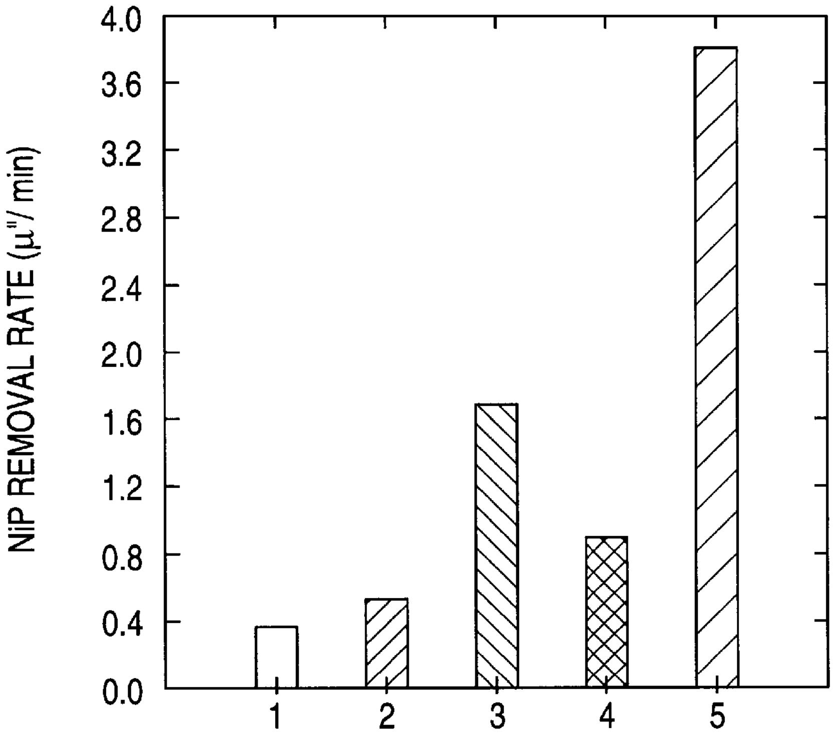
FIGS. 2A and 2B illustrate the results of polish tests performed using a planetary polisher and various colloidal silica slurry formulations. The polish performance of the various formulations was measured in terms of NiP removal rate (FIG. 2A) and polished surface roughness (FIG. 2B).
Figure 2B:
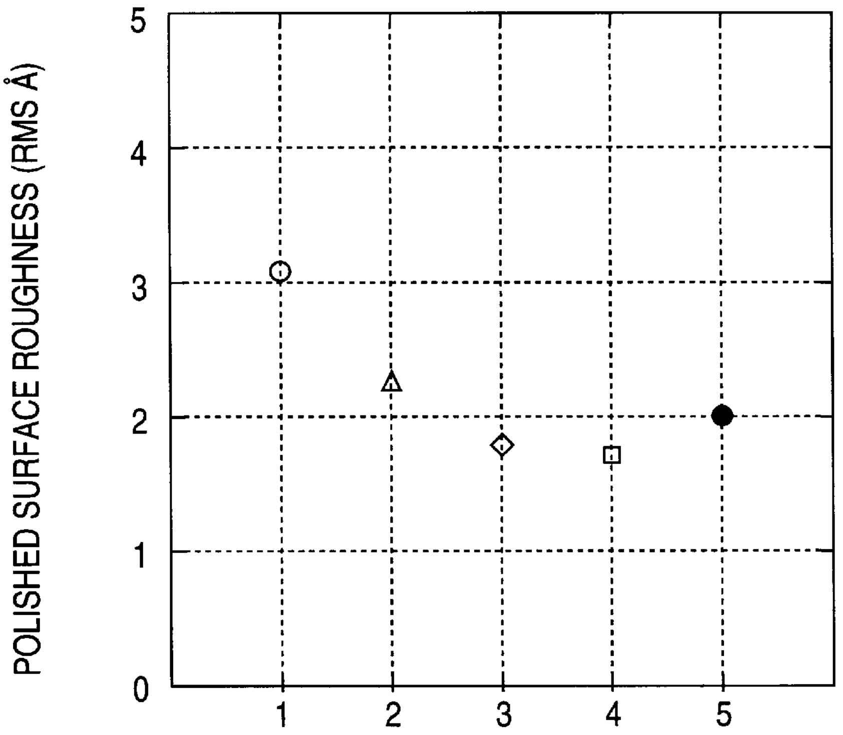

FIGS. 2A and 2B show the NiP polish performance of a slurry in accordance with one embodiment of my invention having an 11 wt. % silica content (composition 5) compared with a slurry including the 11 wt. % silica and an alkaline etchant (composition 1) the slurry of composition 1 combined with hydrogen peroxide (composition 2), the slurry of composition 1 combined with aluminum nitrate (composition 3), and the slurry of composition 1 combined with nitric acid (composition 4).

The slurries tested in FIGS. 2A and 2B were prepared as follows:

No. Slurry Composition

1. The slurry formed by adding 1 part Compol 80 to 3 parts water. The pH was about 9.7 to 9.8.
2. The slurry was 1 part Compol 80, 3 parts water, and 0.2 parts 30 wt. % $H_2O_2$ solution.
3. The slurry was 1 part Compol 80, 3 parts water, and 0.1 parts of a 30 wt. % $Al(NO_3)_3$ solution; no $H_2O_2$.
4. The slurry was 1 part Compol 80, 3 parts water, and 0.008 part 70 wt. % $HNO_3$ solution.
5. The slurry was 1 part Compol 80, 3 parts water, 0.1 parts of a 30 wt. % $Al(NO_3)_3$ solution, 0.1 parts of a 30 wt. % $H_2O_2$ solution, and 0.004 parts of a 70 wt. % $HNO_3$ solution.

Bar 1 in FIG. 2A shows the NiP removal rate of the commercial colloidal silica slurry with the alkaline etchant. The removal rate was about 0.4 $\mu$"/min (0.01 $\mu$m/min). The polished surface roughness with this slurry was about 0.31 nm RMS as shown by the clear circle in FIG. 2B.

Bar 2 shows the removal rate for a slurry containing $H_2O_2$. The material removal rate was increased to about 0.5 $\mu$"/min (0.0127 $\mu$m/min) and the polished surface roughness decreased to about 0.23 nm as shown by bar 2 in FIG. 2A and the clear triangle in FIG. 2B.

The formulation of slurry no. 1 was changed by adding aluminum nitrate as an etchant to form slurry no. 3. The pH of slurry no. 3 was about 3.1. The NiP removal rate increased significantly to about 1.7 $\mu$"/min (0.043 $\mu$m/min) and the polished surface roughness decreased to 0.18 nm. This is shown by bar 3 and the clear diamond in FIGS. 2A and 2B , respectively.

Using nitric acid as etchant in the colloidal silica slurry (the pH was about 3.0), the NiP removal rate was 0.9 $\mu$"/min (0.023 $\mu$m/min), and the polished surface roughness was about 0.18 nm as shown by bar 4 and the clear square in FIGS. 2A and 2B. As can be seen, a large gain in the NiP removal rate (compared to the commercial slurry no. 1) was not obtained when the slurry pH value was decreased to about 2 by adding nitric acid.

Bar 5 represents the NiP removal rate of a colloidal silica slurry in accordance with an embodiment of my invention. The removal rate was 3.8 $\mu$"/min (0.1 $\mu$m/min)—about ten times higher than the colloidal silica with the same silica content and the alkaline etchant. The polished surface finish roughness was about 0.2 nm RMS as shown by the solid circle in FIG. 2B.

The results of polish pitting evaluation and polish scratch evaluation for the colloidal silica slurries of FIG. 2 are shown in Table 1. The commercial colloidal silica with the alkaline etchant showed a large pitting propensity during NiP polishing caused scratches on the NiP surface. Both aluminum rate and nitric acid worked well to removal polish atches. However, aluminum nitrate and nitric acid cause polish pits depending on polishing ditions. Although hydrogen peroxide did not remove ish scratches significantly, it substantially vented pitting during the NiP polish process with loidal silica slurry. The formulation with the odiment of my invention combined the benefits from se three chemicals as follows:

TABLE 1

| Bar chart No. in FIG. 2A | Slurry formulation | Polish scratches observed | Polish pitting propensity |
|---|---|---|---|
| 1 | Commercial colloidal silica with an alkaline etchant | Many | High |
| 2 | Commercial colloidal silica with an alkaline etchant and hydrogen peroxide addition | Many | No |
| 3 | The colloidal silica with aluminum nitrate etchant | No | Low |
| 4 | The colloidal silica with nitric acid etchant | No | Low |
| 5 | The colloidal silica in accordance with one embodiment of my invention | Very few | No |

To summarize:

1) Hydrogen peroxide can significantly remove pitting caused when polishing with a colloidal silica slurry. Hydrogen peroxide also provides a minor contribution in removing polish scratches and increasing the NiP removal rate of the colloidal silica slurry.

2) Aluminum nitrate can significantly increase the NiP removal rate of a colloidal silica slurry and remove polish scratches. However, aluminum nitrate may cause polish pits and cause the slurry to jell. The jelling time depends on the amount of water and nitrate added. More water helps to break the jell.

3) Nitric acid can increase the NiP removal rate of a colloidal silica slurry, but not as much as aluminum nitrate if the nitric acid is used alone. Nitric acid also causes polish pits. However, nitric acid can prevent the colloidal silica from jelling, which would result from nitrate addition. Nitric acid can also effectively increase the material removal rate when used with nitrate.

Figure 3A:
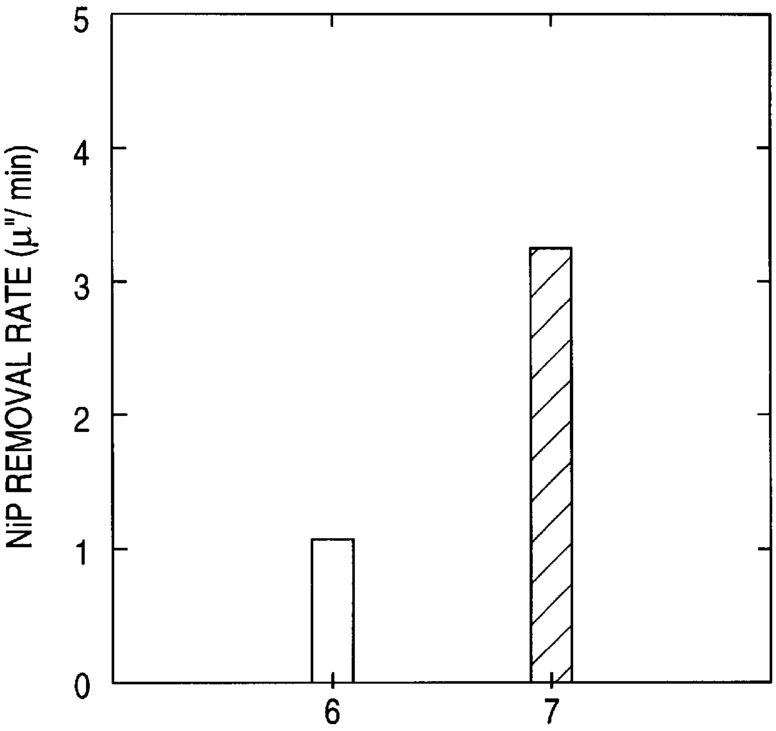
FIG. 3 illustrates the polish performance of a colloidal alumina slurry in accordance with an embodiment of my invention compared to a commercial colloidal alumina slurry containing an acidic etchant. The polish performance of the colloidal alumina slurries was measured in terms of NiP removal rate (FIG. 3A) and polished surface roughness (FIG. 3).
Figure 3B:
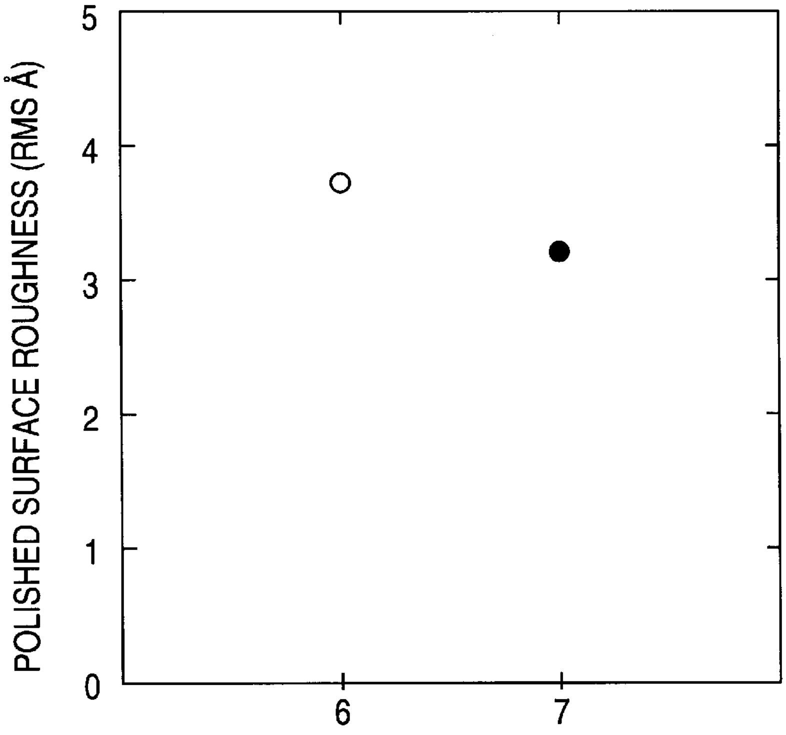

As mentioned above, my invention is also applicable to colloidal alumina slurry. FIGS. 3A and 3B show the NiP polish performance of colloidal alumina slurry in accordance witn one embodiment of my invention (slurry no. 7) compared to that of a conventional alumina colloidal slurry with an acidic etchant (slurry no. 6). Slurry no. 6 was EP1000, provided by Cabot Corp. of Aurora, Ill. The particle size was about 100 nm, and the pH of the slurry was about 4. Slurry no. 7 was formed by providing a mixture of 25 parts of a 30 wt. % aluminum nitrate solution, 1 part of a 70 wt. % nitric acid solution, and 25 parts of a hydrogen peroxide solution. This mixture was added to slurry no. 6 (8% by volume of the resulting slurry was the aluminum nitrate/nitric acid/hydrogen peroxide mixture). The pH of the resulting slurry was about 3.0.

The material removal rate for the EP1000 slurry was 1.1 $\mu$"/min (0.028 $\mu$m/min) (bar 6 in FIG. 3A). The removal rate was increased to 3.3 $\mu$"/min (0.084 $\mu$m/min) (bar 7 in FIG. 3A) by adding aluminum nitrate, nitric acid and hydrogen peroxide to the slurry. The polished surface roughness was lowered from 0.38 nm (the clear circle in FIG. 3B) to 0.33 nm (the solid circle in FIG. 3B). The results of polish scratch and polish pitting evaluation are shown in Table 2. Both polish scratches and polish pitting propensity were decreased with the embodiment of my invention.

TABLE 2

| Bar Chart No. in FIG. 3A | Slurry formulation | Polish scratches observed | Polish pitting propensity |
|---|---|---|---|
| 6 | A commercial colloidal alumina slurry with an acidic etchant | Many | High |
| 7 | The colloidal alumina slurry in accordance with one embodiment of my invention | Less | Very Low |

Industrial Application

In one embodiment, the slurry is used to polish an NiP layer plated onto an Al substrate as part of a magnetic disk manufacturing process. In one embodiment, the polishing apparatus is a planetary polisher, such as the above-mentioned SpeedFam polisher. The polishing parameters may be the same as for the experiments described in the tables and figures discussed above. However, it may be desirable to increase the normal loading force to increase through-put. In one embodiment, a normal loading force of 390 kg is used. (The SpeedFam apparatus polishes 42 disks at a time, which means a force of about 9.2 kg/disk is applied.) Larger normal loading forces can be used. I have not encountered an increase in defects when using a high normal force. Also, I have found that aluminum nitrate decreases friction during polishing, which facilitates use of a higher normal loading force.

Figure 4A:
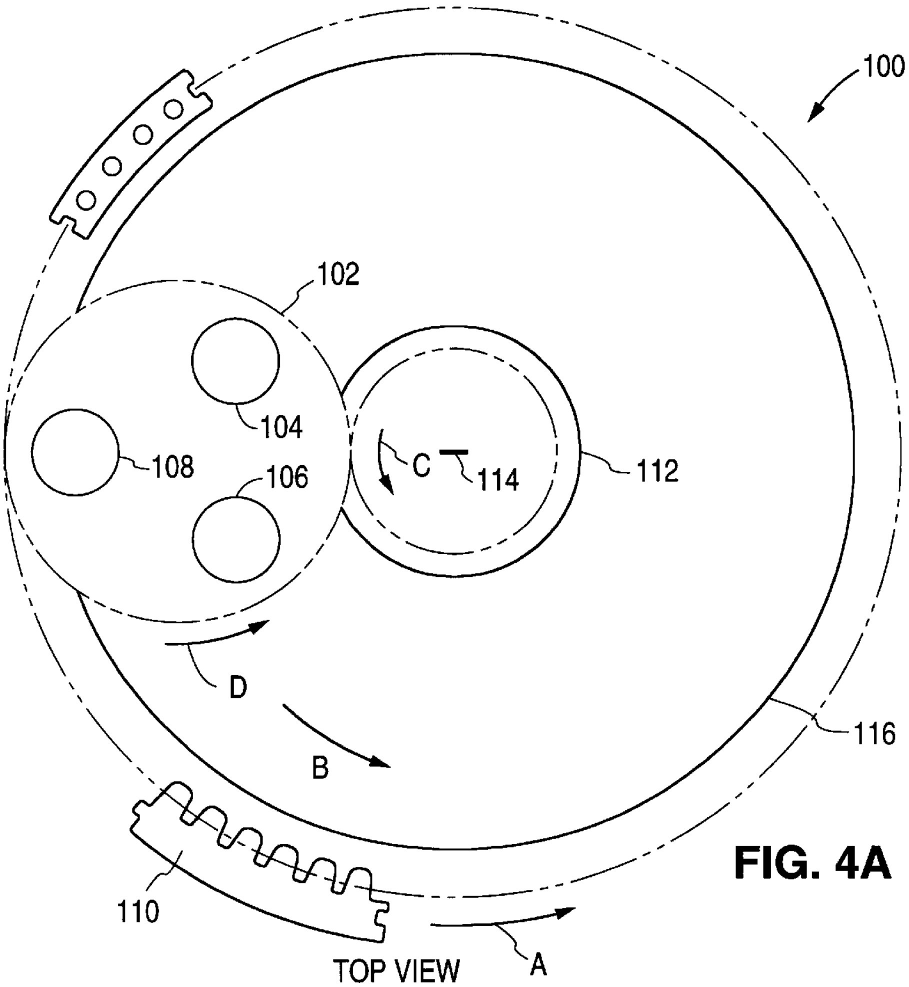
FIGS. 4A and 4B schematically show a planetary polishing apparatus in plan view and cross section, respectively.
Figure 4B:
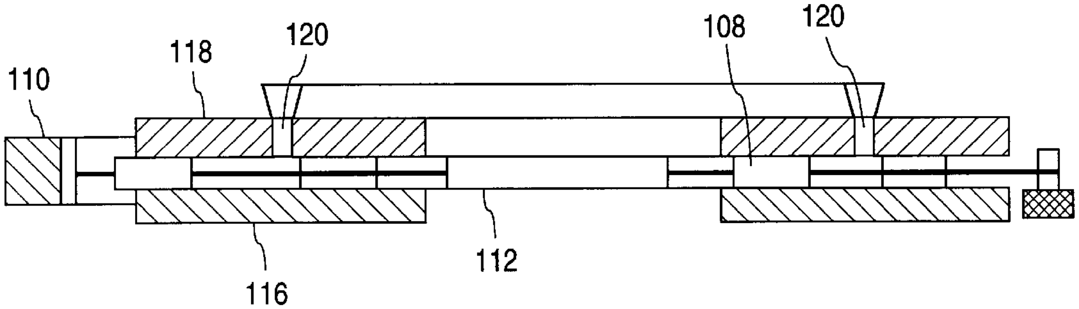

FIGS. 4A and 4B schematically show a planetary polisher 100 including a circular disk holder 102 which holds disks 104, 106 and 108 during polishing. Although only three disks 104, 106, 108 are held by one holder 102 as shown in FIG. 4, the above-mentioned SpeedFam polisher simultaneously polishes 42 disks.

During polishing, a gear 110 rotates in the direction of arrow A around a central circular member 112, causing holder 102 to move around member 112 in a direction B. Simultaneously, central circular member 112 rotates in a direction C, and holder 102 rotates around its central axis in direction a D.

Simultaneously stationary top lap surface 116 and bottom lap surface 118 rub against and polish disks 104, 106 and 108. The slurry is applied to the regions between the lapping pads 116, 118 and disks 104, 106 and 108 via channels 120.

Figure 5:
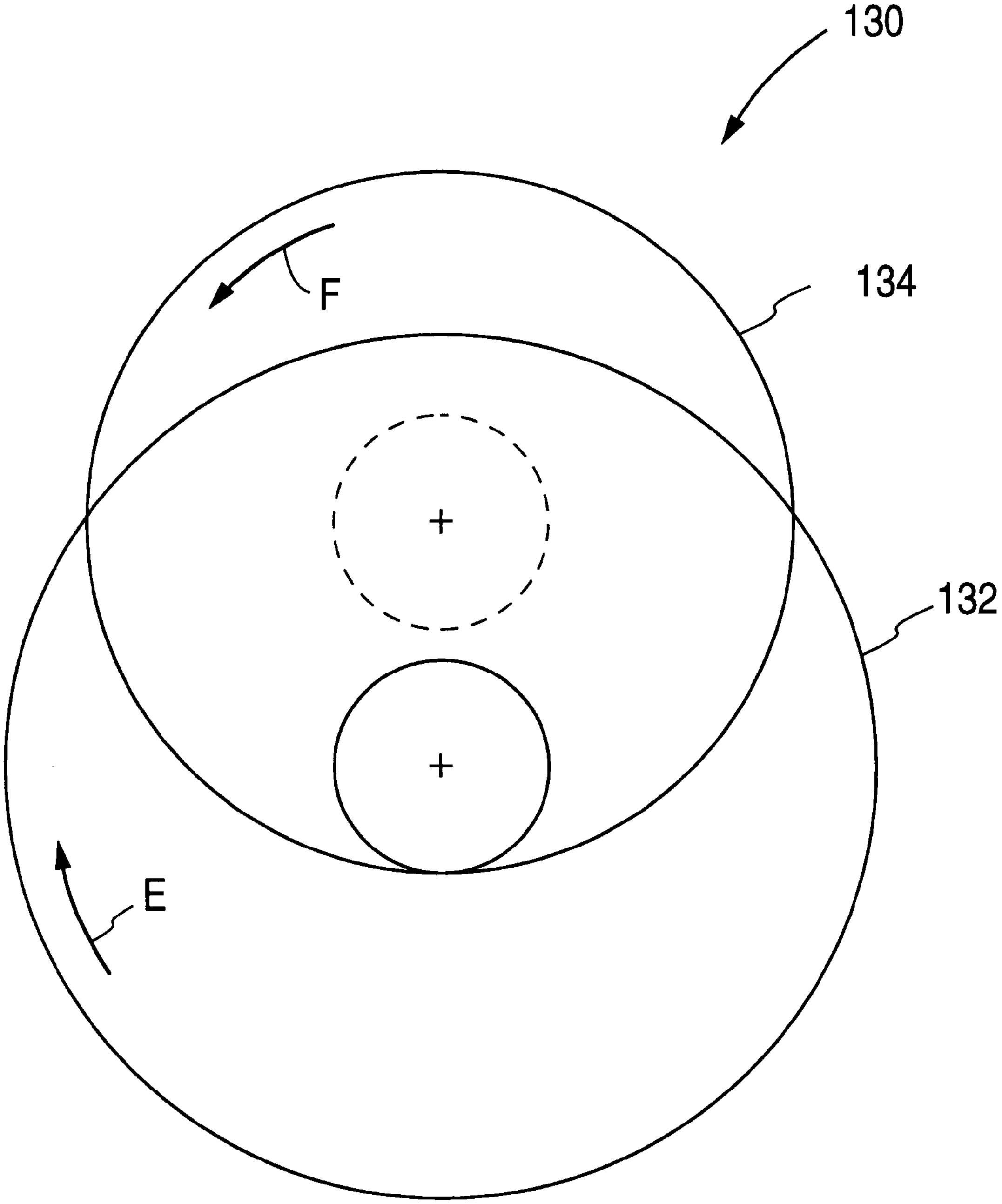
FIG. 5 schematically shows a single disk polishing apparatus.

In another embodiment, a single-disk type polisher is used to polish the NiP plated layer. Such a single disk polisher can have a structure similar to the Strasbaugh 6DEDC-25P2 texturing apparatus. FIG. 5 schematically shows a single disk polishing apparatus 130 for polishing a disk 132 with a polishing pad 134. During polishing, disk 132 rotates in a direction E while pad 134 presses against disk 132 and rotates in a direction F. One side of disk 132 is polished at a time. The slurry of the present invention is introduced between pad 134 and disk 132.

In yet another embodiment, a ring type polisher is used to polish the NiP layer. In one embodiment, the ring type polisher can be an MDS ring polisher available from SpeedFam.

Figure 6:
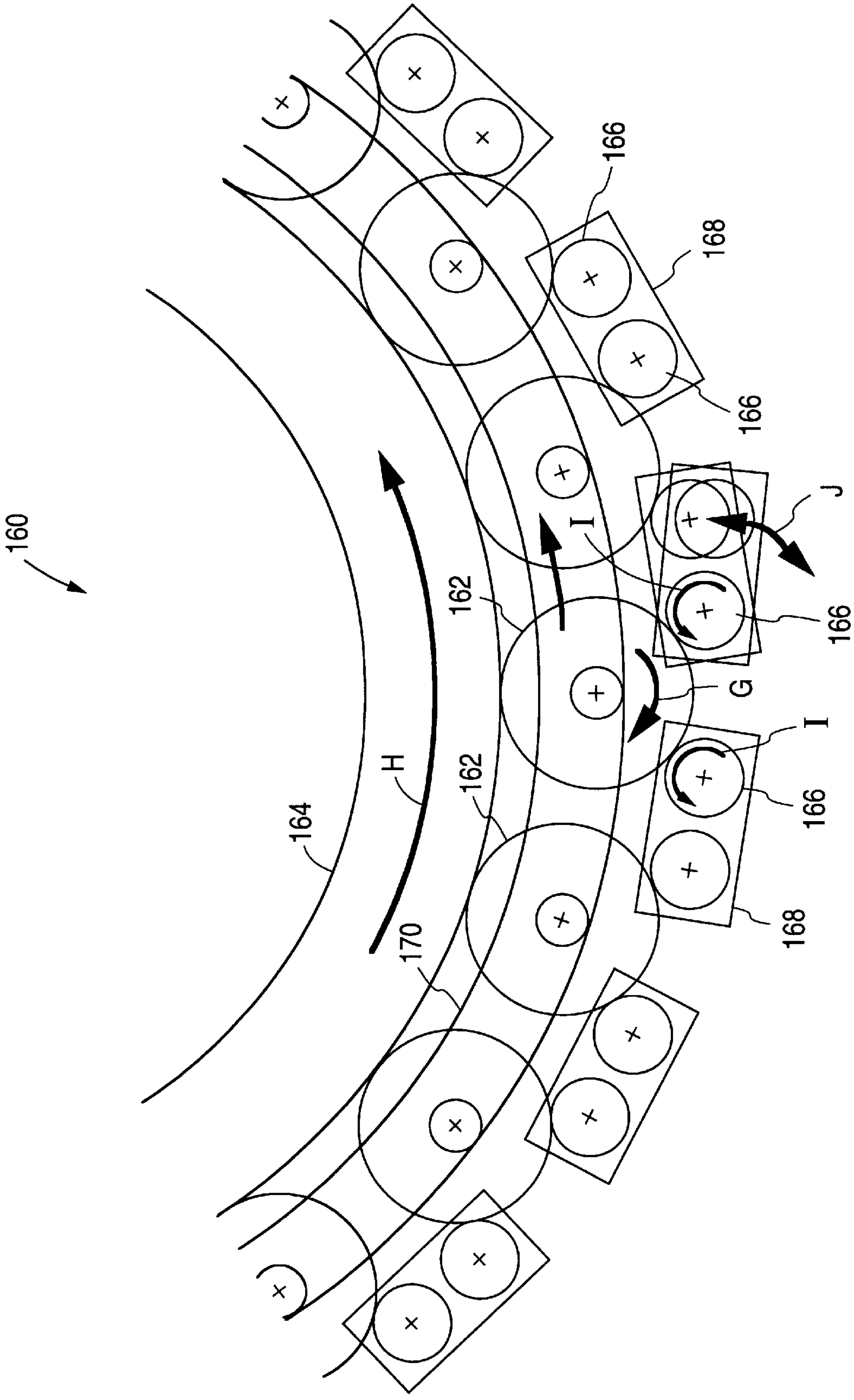
FIG. 6 schematically shows a ring polishing apparatus.

FIG. 6 schematically shows a ring polisher 160 for polishing disks 162. During polishing, disks 160 are rotated in a direction G by the motion of a center driving ring 164 in direction H. Disks 162 are urged against ring 164 by pivoting stanchions 166. (Pivoting stanchions 166 are mounted to stanchion assemblies 168. During use, stanchions 166 are caused to rotate in direction I by the motion of disks 162.)

During use, while disks 162 are rotated by center driving ring 164, a lower polishing platen 170 presses against disks 162 to thereby polish the lower surface of disks 162. Simultaneously, an upper platen (not shown, but having the same lateral extent as lower platen 170) pushes down on disks 162 to thereby polish the upper surface of disks 162. A slurry in accordance with my invention is introduced into the space between the platens and disks 162.

After polishing, the NiP is typically textured. After texturing, the magnetic disk is completed by sputtering an underlayer (typically NiP or Cr), a magnetic Co alloy and a hydrogenated carbon overcoat onto the substrate in that order. A liquid lubricant is then deposited onto the carbon. Details concerning these steps are disclosed in U.S. Pat. No. 5,658,659, issued on Aug. 19, 1997 to Chen et al., incorporated herein by reference.

Although the slurry can be used to manufacture magnetic disks, it can also be used to manufacture other products, and to polish materials other than NiP, e.g. Ni, Al, or other metals or alloys thereof.

While the invention has been described with respect to a specific embodiment, those skilled in the art will recognize that changes can be made in form and detail without departing from the spirit and scope of the invention. For example, as mentioned above, instead of using aluminum nitrate as main NiP removal promoter in a colloidal silica slurry, other nitrates, such as ferronitrate, can be used. A nitrate etchant in accordance with my invention can also be used with aqueous colloidal abrasive solids other than aqueous colloidal silica or alumina. In addition, my invention can be used with a slurry having colloidal silica and alumina combined. Accordingly, all such changes come within the invention.

I claim:

1. A colloidal slurry for use in a polishing process comprising:

aqueous colloidal silica abrasive for abrasively polishing a workpiece; and a metal nitrate salt for increasing the polishing rate during chemical mechanical polishing with said slurry, wherein said metal nitrate salt is $Al(NO_3)_3$ and said slurry further comprises $HNO_3$ and $H_2O_2$, and wherein said $HNO_3$ is present in an amount sufficient to prevent said colloidal silica from jelling and said $H_2O_2$ is present in an amount sufficient to prevent pit formation when said slurry is used to polish.

2. A colloidal slurry for use in a polishing process comprising:

aqueous colloidal silica abrasive for abrasively polishing a workpiece; and a metal nitrate salt for increasing the polishing rate during chemical mechanical polishing with said slurry, wherein said metal nitrate salt is $Al(NO_3)_3$ and said slurry further comprises $HNO_3$ and $H_2O_2$, and wherein said slurry comprises between 2 and 40 wt. % silica, 0.1 and 2.5 wt. % $Al(NO_3)_3$, greater than 0 wt. % but less than or equal to 1 wt. % $HNO_3$, and between 0.1 and 3 wt. % $H_2O_2$.

3. Slurry of claim 2 wherein said slurry comprises greater than 0 wt. % but less than 0.2 wt. % $HNO_3$, and between 0.1 and 2 wt. % $Al(NO_3)_3$.

4. Slurry of claim 2 comprising between 0.02 and 0.1 wt. % $HNO_3$ and between 0.2 and 1 wt. % $Al(NO_3)_3$.

5. A slurry for use in a polishing process comprising:

alumina abrasive particles;

a metal nitrate salt comprising $Al(NO_3)_3$;

$H_2O_2$; and $HNO_3$, wherein said slurry comprises between 2 and 40 wt. % alumina, 0.1 and 2.5 wt. % $Al(NO_3)_3$, greater than 0 wt. % but less than or equal to 1 wt. % $HNO_3$, and between 0.1 and 3 wt. % $H_2O_2$.

6. A slurry for use in a polishing process comprising:

abrasive particles:

a metal nitrate salt comprising $Al(NO_3)_3$;

$H_2O_2$, and $HNO_3$, wherein said slurry comprises between 2 and 40 wt. % alumina, and between 0.1 and 3 wt. % $H_2O_2$, and wherein said slurry comprises between 0.02 and 0.1 wt. % $HNO_3$ and between 0.2 and 1 wt. % $Al(NO_3)_3$.

7. A method for polishing comprising the step of polishing a workpiece with a slurry, said slurry comprising colloidal abrasive silica and a metal nitrate salt, said slurry having a pH less than about 3.5, said metal nitrate salt increasing the polishing rate of said slurry, wherein said workpiece comprises NiP.

8. A method for polishing comprising the step of polishing a workpiece with a slurry, said slurry comprising colloidal abrasive silica and a metal nitrate salt, said slurry having a pH less than about 3.5, said metal nitrate salt increasing the polishing rate of said slurry, wherein said workpiece comprises nickel or a nickel alloy.

9. A method for polishing comprising the step of polishing a workpiece with a slurry, said slurry comprising colloidal abrasive silica and a metal nitrate salt, wherein said workpiece comprises NiP.

10. Method for polishing of claim 9 wherein said metal nitrate salt increases the polishing rate of said slurry.

11. Method for polishing of claim 9 wherein said metal nitrate salt is aluminum nitrate.

12. A method for polishing comprising the step of polishing a workpiece with a slurry, said slurry comprising colloidal abrasive silica and a metal nitrate salt, wherein said workpiece comprises nickel or a nickel alloy.

13. Method for polishing of claim 12 wherein said metal nitrate salt increases the polishing rate of said slurry.

14. Method of claim 12 wherein said metal nitrate salt is aluminum nitrate.

15. A method for polishing comprising:

applying a slurry against a workpiece so as to polish said workpiece, said slurry comprising abrasive particles and a metal nitrate, said slurry having a pH less than about 3.5, wherein said abrasive particles comprise colloidal silica and wherein said workpiece comprises NiP.

16. A method for polishing comprising:

applying a slurry against a workpicce so as to polish said workpiece, said slurry having a composition as in claim 11.

17. A method for polishing comprising:

applying a slurry against a workpiece so as to polish said workpiece, said slurry having a composition as in claim 2.

18. A method for polishing comprising:

applying a slurry against a workpiece so as to polish said workpiece, said slurry having a composition as in claim 5.

* * * * *

UNITED STATES PATENT AND TRADEMARK OFFICE

CERTIFICATE OF CORRECTION

PATENT NO. : 6,149,696
DATED : November 21, 2000
INVENTOR(S) : Kang Jia

It is certified that error appears in the above-identified patent and that said Letters Patent is hereby corrected as shown below:

Column 10,
Line 25, "11" should be -- 1 --.

Signed and Sealed this

Eighteenth Day of June, 2002

*Attest:*

JAMES E. ROGAN

*Attesting Officer*

*Director of the United States Patent and Trademark Office*

UNITED STATES PATENT AND TRADEMARK OFFICE

CERTIFICATE OF CORRECTION

PATENT NO. : 6,149,696

DATED : November 21, 2000

INVENTOR(S) : Kang Jia

It is certified that error appears in the above-identified patent and that said Letters Patent is hereby corrected as shown below:

<u>Column 1,</u>
Lines 19-20, “A increasing recording density in computer disk drives.” should read -- With increasing recording density in computer disk drives, a smoother polished NiP surface with fewer polish defects is required. --

<u>Column 5,</u>
Line 60, “aluminum rate” should read -- aluminum nitrate --.
Line 61, “atches” should read -- scratches --.
Line 62, “ditions” should read -- conditions --.
Line 63, “ish” should read -- polish --.
Line 64, “vented” should read -- prevented --.
Line 65, “loidal” should read -- colloidal --.
Line 65, “odiment” should read -- embodiment --.
Line 66, “se” should read -- these --.

Signed and Sealed this

Eighth Day of February, 2005

Jon W. Dudas

JON W. DUDAS
*Director of the United States Patent and Trademark Office*